United States Patent
Yang et al.

(10) Patent No.: US 11,647,534 B2
(45) Date of Patent: May 9, 2023

(54) PHYSICAL LAYER AND MAC LAYER UPLINK CHANNEL PRIORITIZATION

(71) Applicant: QUALCOMM Incorporated, San Diego, CA (US)

(72) Inventors: Wei Yang, San Diego, CA (US); Jing Jiang, San Diego, CA (US); Linhai He, San Diego, CA (US); Seyedkianoush Hosseini, San Diego, CA (US); Wanshi Chen, San Diego, CA (US); Peter Gaal, San Diego, CA (US); Yi Huang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 29 days.

(21) Appl. No.: 17/304,279

(22) Filed: Jun. 17, 2021

(65) Prior Publication Data
US 2021/0314972 A1    Oct. 7, 2021

Related U.S. Application Data

(63) Continuation of application No. 16/594,707, filed on Oct. 7, 2019, now Pat. No. 11,122,591.
(Continued)

(51) Int. Cl.
*H04W 72/12* (2009.01)
*H04L 1/00* (2006.01)
(Continued)

(52) U.S. Cl.
CPC ....... *H04W 72/1242* (2013.01); *H04L 1/0013* (2013.01); *H04L 1/0016* (2013.01);
(Continued)

(58) Field of Classification Search
CPC ......... H04W 72/1242; H04W 72/1268; H04W 72/14; H04L 1/0013; H04L 1/0016; H04L 1/0018
See application file for complete search history.

(56) References Cited

U.S. PATENT DOCUMENTS 11,265,854 B2 *  3/2022  Yang .................... H04L 5/0053
11,363,573 B2 *  6/2022  Yamamoto .......... H04W 52/146
(Continued)

FOREIGN PATENT DOCUMENTS

EP      3284312 A1    2/2018
TW      201818769 A   5/2018

OTHER PUBLICATIONS

Taiwan Search Report—TW108136360—TIPO—dated Nov. 20, 2021.
(Continued)

*Primary Examiner* — Min Jung
(74) *Attorney, Agent, or Firm* — Harrity & Harrity, LLP; Kevin T. Cheatham

(57) ABSTRACT

Various aspects of the present disclosure generally relate to wireless communication. In some aspects, a user equipment (UE) may select a first communication, associated with a first traffic type, or a second communication, associated with a second traffic type, as a selected communication for transmission in an overlapping resource, wherein the first communication and the second communication at least partially overlap in time, and wherein the selection is performed based at least in part on a rule; and transmit the selected communication. Numerous other aspects are provided.

30 Claims, 8 Drawing Sheets

Related U.S. Application Data

(60) Provisional application No. 62/743,511, filed on Oct. 9, 2018.

(51) Int. Cl.
*H04W 72/1268* (2023.01)
*H04W 72/14* (2009.01)

(52) U.S. Cl.
CPC ....... *H04L 1/0018* (2013.01); *H04W 72/1268* (2013.01); *H04W 72/14* (2013.01)

(56) References Cited

U.S. PATENT DOCUMENTS

| | | | |
|---|---|---|---|
| 2018/0184431 | A1 | 6/2018 | Li et al. |
| 2019/0182896 | A1 | 6/2019 | Shrestha et al. |
| 2019/0230683 | A1 | 7/2019 | Akkarakaran et al. |
| 2019/0239283 | A1 | 8/2019 | Kwak et al. |
| 2019/0394758 | A1* | 12/2019 | Cheng ................... H04W 76/27 |
| 2020/0022160 | A1 | 1/2020 | Zou et al. |
| 2020/0053761 | A1 | 2/2020 | Hosseini et al. |
| 2020/0053801 | A1 | 2/2020 | Hosseini et al. |
| 2020/0068558 | A1 | 2/2020 | Yang et al. |
| 2020/0112391 | A1 | 4/2020 | Yang et al. |
| 2020/0351896 | A1* | 11/2020 | Taherzadeh Boroujeni ................ H04L 5/0051 |
| 2020/0374899 | A1 | 11/2020 | Ohta |
| 2020/0374905 | A1 | 11/2020 | Lin |
| 2021/0068114 | A1* | 3/2021 | Xu ........................ H04W 76/27 |
| 2021/0298008 | A1* | 9/2021 | Yamamoto ............ H04W 28/04 |
| 2021/0337569 | A1* | 10/2021 | Fu ........................ H04L 5/0064 |
| 2021/0392664 | A1* | 12/2021 | Alabbasi ............... H04W 72/14 |

OTHER PUBLICATIONS

Intel Corporation: "SR Configuration and UL Data Scheduling", 3GPP TSG RAN WG1 NR Ad-Hoc#2, 3GPP Draft; R1-1710567, Intel SR UL Data Scheduling, 3rd Generation Partnership Project (3GPP), Mobile Competence Centre, 650, Route Des Lucioles ; F-06921 Sophia-Antipolis Cedex, France, vol. RAN WG1, No. Qingdao. P.R. China; Jun. 27, 2017-Jun. 30, 2017, Jun. 26, 2017 (Jun. 26, 2017), pp. 1-5, XP051299774, Retrieved from the Internet: URL: http://www.3gpp.org/ftp/Meetings_3GPP_SYNC/RAN1/Docs/ [retrieved on Jun. 26, 2017].

Interdigital, et al., "Power Control for Transmissions with Different Service Requirements", 3GPP TSG RAN WG1 RAN1 #92bis, 3GPP Draft; R1-1804678 (R15 NR WI AI 725 NR URLLC UL PC), 3rd Generation Partnership Project (3GPP), Mobile Competence Centre, 650, Route Des Lucioles, F-06921 Sophia-Anti Polis Cedex, France, vol. RAN WG1, No. Sanya, China; Apr. 16, 2018-Apr. 20, 2018, Apr. 15, 2018 (Apr. 15, 2018), pp. 1-3, XP051426945, Retrieved from the Internet: URL: http://www.3gpp.org/ftp/Meetings%5F3GPP%5FSYNC/RAN1/Docs/[retrieved on Apr. 15, 2018].

International Search Report and Written Opinion—PCT/US2019/055215—ISA/EPO—dated Jan. 2, 2020.

LG Electronics Inc: "Prioritization between Dynamic Grant and Configured Grant for URLLC", 3GPP TSG-RAN2 NR AH 1801, 3GPP Draft; R2-1801239_Prioritization Between Dynamic Grant and Configured Grant for URLLC, 3rd Generation Partnership Project (3GPP), Mobile Competence Centre, 650, Route Des Lucioles ; F-06921 Sophia-Antipolis Cedex, France, vol. RAN WG2, No. Vancouver, Canada; Jan. 22, 2018-Jan. 26, 2018, Jan. 12, 2018 (Jan. 12, 2018), 2 Pages, XP051386668, Retrieved from the Internet: URL: http://www.3gpp.org/ftp/tsg%5Tran/WG2%5FRL2/TSGR2%5FAHs/2018%5F01%5FNR/Docs/, [retrieved on Jan. 12, 2018].

Panasonic: "Discussion on SR for URLLC and Multiplexing with HARQ-ACK", 3GPP TSG RAN WG1 NR Ad-Hoc#2, 3GPP Draft; R1-1710942, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017 (Jun. 26, 2017), pp. 1-2, XP051300143, Retrieved from the Internet: URL: http://www.3gpp.org/ftp/Meetings_3GPP_SYNC/RAN1/Docs/ [retrieved on Jun. 26, 2017] the whole document.

Qualcomm Incorporated: "Urllc Dl Pre-Emption and UL Suspension Indication Channel Design", 3GPP Draft, 3GPP Tsg Ran WG1 Nr Ad-Hoc #3, R1-1716434, Urllc Dl Pre-Emption and UL Suspension Indication Channel Design, 3RD Generation Partnership Project (3GPP), Mobile Competence Centre 650, Route Des Lucioles, F-06921 Sophia, vol. Ran WG1, No. Nagoya, Japan, 20170918 -20170921, Sep. 17, 2017 (2017-09-17), XP051339889, pp. 1-9, Retrieved from the Internet: URL:http://www.3gpp.org/ftp/Meetings_3GPP_SYNC/RAN1/Docs/ [retrieved on 2017-09-17] paragraph [0002] - paragraph [0004] paragraph [0001], pp. 4-5, 3 Dynamic multiplexing between eMBB and URLLC on the uplink, pp. 5-6, 4.1 Design motivation, pp. 6-7, 4.2 The design principles for the indication channel, pp. 7-8,5 Application to the Indication Channel Design for UL eMBB/URLLC multiplexing.

* cited by examiner

PHYSICAL LAYER AND MAC LAYER UPLINK CHANNEL PRIORITIZATION

CROSS-REFERENCE TO RELATED APPLICATIONS

This application is a continuation of U.S. patent application Ser. No. 16/594,707, filed Oct. 7, 2019, entitled "PHYSICAL LAYER AND MAC LAYER UPLINK CHANNEL PRIORITIZATION," which claims priority to U.S. Provisional Patent Application No. 62/743,511, filed on Oct. 9, 2018, entitled "PHYSICAL LAYER AND MAC LAYER UPLINK CHANNEL PRIORITIZATION," which are hereby expressly incorporated by reference herein.

FIELD OF THE DISCLOSURE

Aspects of the present disclosure generally relate to wireless communication, and more particularly to techniques and apparatuses for physical layer and media access control (MAC) layer uplink channel prioritization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include selecting a first communication, associated with a first traffic type, or a second communication, associated with a second traffic type, as a selected communication for transmission in an overlapping resource, wherein the first communication and the second communication at least partially overlap in time, and wherein the selection is performed based at least in part on a rule; and transmitting the selected communication.

In some aspects, a UE for wireless communication may include memory and one or more processors operatively coupled to the memory. The memory and the one or more processors may be configured to select a first communication, associated with a first traffic type, or a second communication, associated with a second traffic type, as a selected communication for transmission in an overlapping resource, wherein the first communication and the second communication at least partially overlap in time, and wherein the selection is performed based at least in part on a rule; and transmit the selected communication.

In some aspects, a non-transitory computer-readable medium may store one or more instructions for wireless communication. The one or more instructions, when executed by one or more processors of a UE, may cause the one or more processors to select a first communication, associated with a first traffic type, or a second communication, associated with a second traffic type, as a selected communication for transmission in an overlapping resource, wherein the first communication and the second communication at least partially overlap in time, and wherein the selection is performed based at least in part on a rule; and transmit the selected communication.

In some aspects, an apparatus for wireless communication may include means for selecting a first communication, associated with a first traffic type, or a second communication, associated with a second traffic type, as a selected communication for transmission in an overlapping resource, wherein the first communication and the second communication at least partially overlap in time, and wherein the selection is performed based at least in part on a rule; and means for transmitting the selected communication.

In some aspects, a method of wireless communication, performed by a UE, may include determining, in a physical layer of the UE, that a scheduling request is configured to be transmitted on a physical random access channel resource, and that the UE is configured to determine priority for an ultra-reliable low latency communication at the physical layer; and determining or transmitting information indicating an error based at least in part on the scheduling request being configured to be transmitted on the physical random access channel resource when the UE is configured to determine priority for the ultra-reliable low latency communication at the physical layer.

In some aspects, a UE for wireless communication may include memory and one or more processors operatively coupled to the memory. The memory and the one or more processors may be configured to determine, in a physical layer of the UE, that a scheduling request is configured to be transmitted on a physical random access channel resource, and that the UE is configured to determine priority for an ultra-reliable low latency communication at the physical layer; and determine or transmit information indicating an error based at least in part on the scheduling request being configured to be transmitted on the physical random access channel resource when the UE is configured to determine priority for the ultra-reliable low latency communication at the physical layer.

In some aspects, a non-transitory computer-readable medium may store one or more instructions for wireless communication. The one or more instructions, when executed by one or more processors of a UE, may cause the one or more processors to determine, in a physical layer of the UE, that a scheduling request is configured to be transmitted on a physical random access channel resource, and that the UE is configured to determine priority for an ultra-reliable low latency communication at the physical layer; and determine or transmit information indicating an error based at least in part on the scheduling request being configured to be transmitted on the physical random access channel resource when the UE is configured to determine priority for the ultra-reliable low latency communication at the physical layer.

In some aspects, an apparatus for wireless communication may include means for determining, in a physical layer of the apparatus, that a scheduling request is configured to be transmitted on a physical random access channel resource, and that the apparatus is configured to determine priority for an ultra-reliable low latency communication at the physical layer; and means for determining or transmitting information indicating an error based at least in part on the scheduling request being configured to be transmitted on the physical random access channel resource when the apparatus is configured to determine priority for the ultra-reliable low latency communication at the physical layer.

In some aspects, a method of wireless communication, performed by a UE, may include selecting a first logical channel, associated with a first traffic type, or a second logical channel, associated with a second traffic type, as a selected communication for transmission, wherein the selection is performed based at least in part on a rule; and transmitting the selected communication in a physical resource scheduled for the first traffic type or the second traffic type.

In some aspects, a UE for wireless communication may include memory and one or more processors operatively coupled to the memory. The memory and the one or more processors may be configured to select a first logical channel, associated with a first traffic type, or a second logical channel, associated with a second traffic type, as a selected communication for transmission, wherein the selection is performed based at least in part on a rule; and transmit the selected communication in a physical resource scheduled for the first traffic type or the second traffic type.

In some aspects, a non-transitory computer-readable medium may store one or more instructions for wireless communication. The one or more instructions, when executed by one or more processors of a UE, may cause the one or more processors to select a first logical channel, associated with a first traffic type, or a second logical channel, associated with a second traffic type, as a selected communication for transmission, wherein the selection is performed based at least in part on a rule; and transmit the selected communication in a physical resource scheduled for the first traffic type or the second traffic type.

In some aspects, an apparatus for wireless communication may include means for selecting a first logical channel, associated with a first traffic type, or a second logical channel, associated with a second traffic type, as a selected communication for transmission, wherein the selection is performed based at least in part on a rule; and means for transmitting the selected communication in a physical resource scheduled for the first traffic type or the second traffic type.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
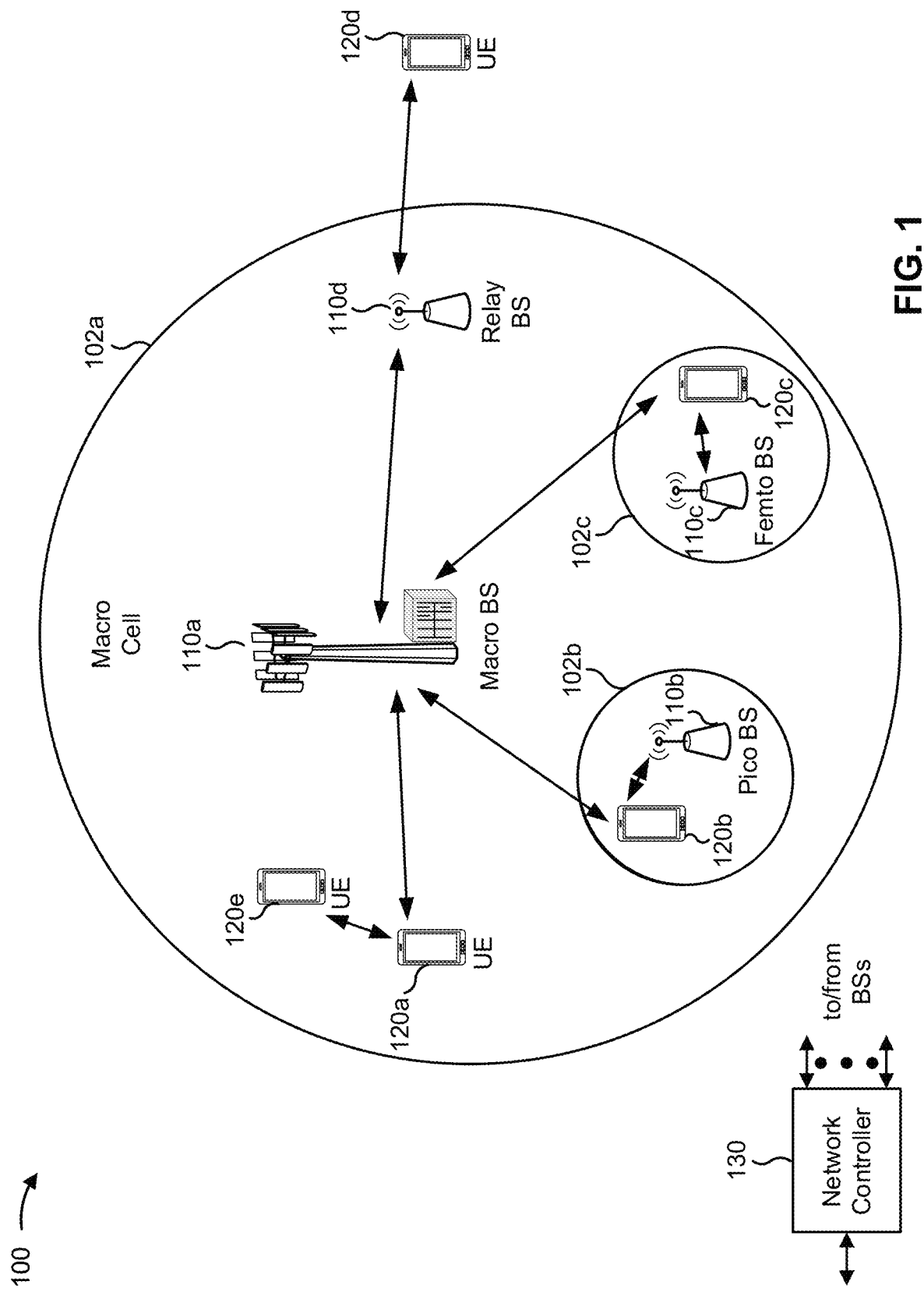
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
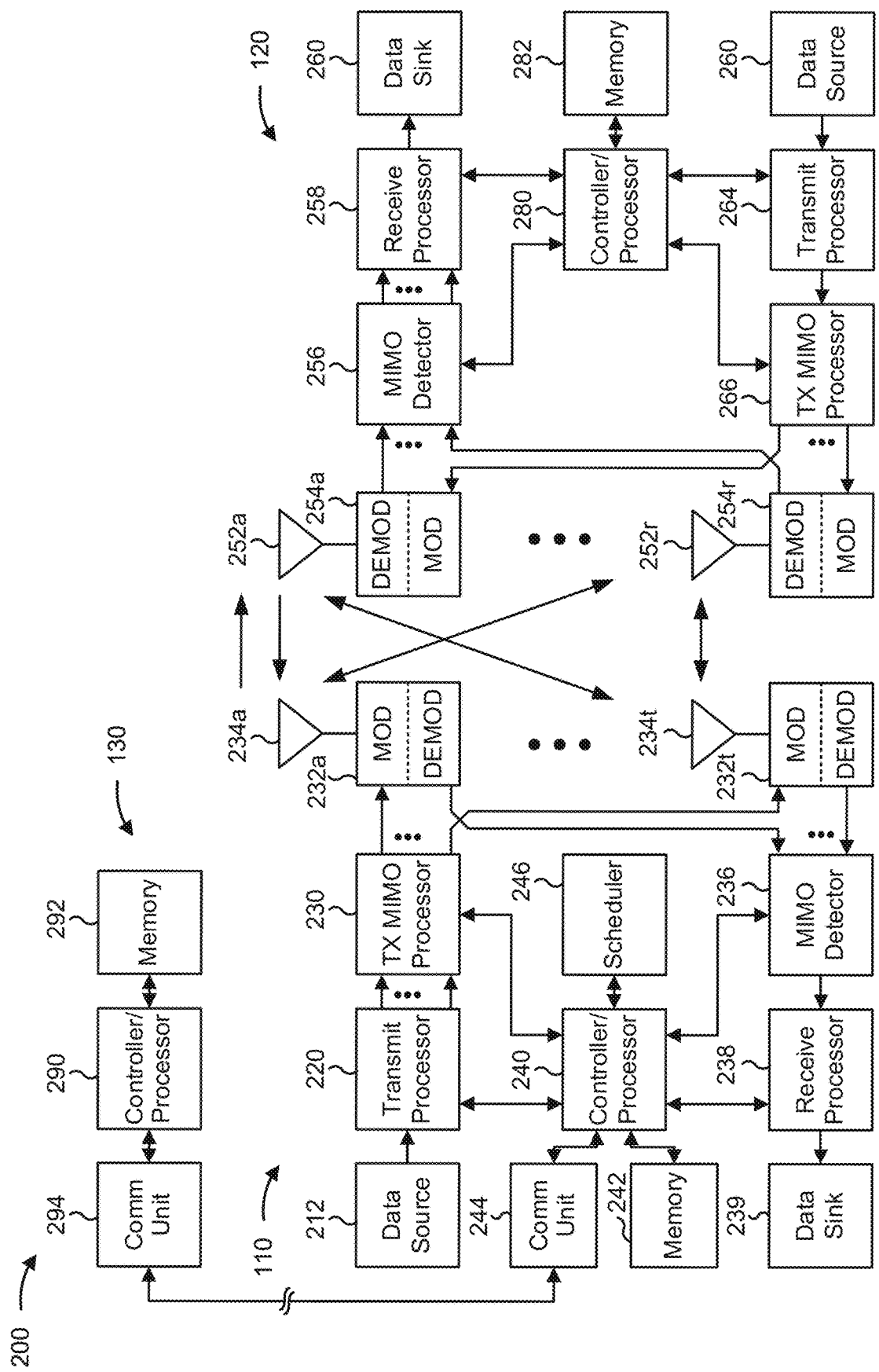
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical layer and MAC layer uplink channel prioritization, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for selecting a first communication, associated with a first traffic type, or a second communication, associated with a second traffic type, as a selected communication for transmission in an overlapping resource, wherein the first communication and the second communication at least partially overlap in time, and wherein the selection is performed based at least in part on a rule; means for transmitting the selected communication; means for dropping an other communication, of the first communication and the second communication and other than the selected communication; means for determining, in a physical layer of the UE, that a scheduling request is configured to be transmitted on a physical random access channel resource, and that the UE is configured to determine priority for an ultra-reliable low latency communication at the physical layer; means for determining or transmitting information indicating an error based at least in part on the scheduling request being configured to be transmitted on the physical random access channel resource when the UE is configured to determine priority for the ultra-reliable low latency communication at the physical layer; means for selecting a first logical channel, associated with a first traffic type, or a second logical channel, associated with a second traffic type, as a selected communication for transmission, wherein the selection is performed based at least in part on a rule; means for transmitting the selected communication in a physical resource scheduled for the first traffic type or the second traffic type; and/or the like. In some aspects, such means may include one or more components of UE 120 described in connection with FIG. 2.

As indicated above, FIG. 2 is provided merely as an example. Other examples may differ from what is described with regard to FIG. 2.

5G/NR may provide for the prioritization of certain traffic types. For example, ultra-reliable low-latency communications (URLLC) may provide for communication using strict latency and/or reliability requirements, whereas enhanced mobile broadband (eMBB) may use a best-effort approach or may use more lax latency and/or reliability requirements than URLLC. Thus, it may be beneficial to prioritize URLLC communications over eMBB communications so that the requirements of the URLLC communications are more easily satisfied.

Furthermore, it may be beneficial to prioritize some communications over other communications. For example, buffer status reports, scheduling requests, and/or the like, are sometimes prioritized over a data channel, since buffer status reports and scheduling requests may provide for the scheduling of a subsequent data channel. However, it may be unclear how communications of different traffic types should be prioritized (e.g., a buffer status report of a lower-priority traffic type versus a data channel of a higher-priority traffic type).

In some cases, prioritization of traffic may be performed in the MAC layer. For example, the MAC layer may select communications for transmission, and may provide the communications to the PHY layer to be transmitted. However, once transmission of a communication has started, the MAC layer may not be able to cause the interruption of the communication for transmission of a different communication. Thus, a low-latency communication, such as a URLLC communication, may have to wait for the end of an ongoing communication before being transmitted when prioritization is handled by the MAC layer, thus increasing latency of the low-latency communication.

Some techniques and apparatuses described herein provide PHY-layer selection of a communication to be prioritized or transmitted in the case of overlapping communications associated with different traffic types. By performing the selection in the PHY layer, the selected communication can be selected and transmitted while transmission of another communication is ongoing, which reduces latency of the selected communication. Some techniques and apparatuses described herein may provide a MAC-layer mechanism for the prioritization of certain traffic types with regard to buffer status reports and data channels, which reduces the likelihood of interruption of a high-priority data channel by a low-priority buffer status report. Furthermore, some techniques and apparatuses described herein provide for the determination of an error case when a scheduling request (e.g., of a URLLC communication or an eMBB communication) overlaps with a physical random access channel resource and when PHY-layer handling of URLLC prioritization is enabled. This may conserve resources of the UE in comparison to attempting to handle the collision, which may be complex in the PHY layer.

Figure 3:
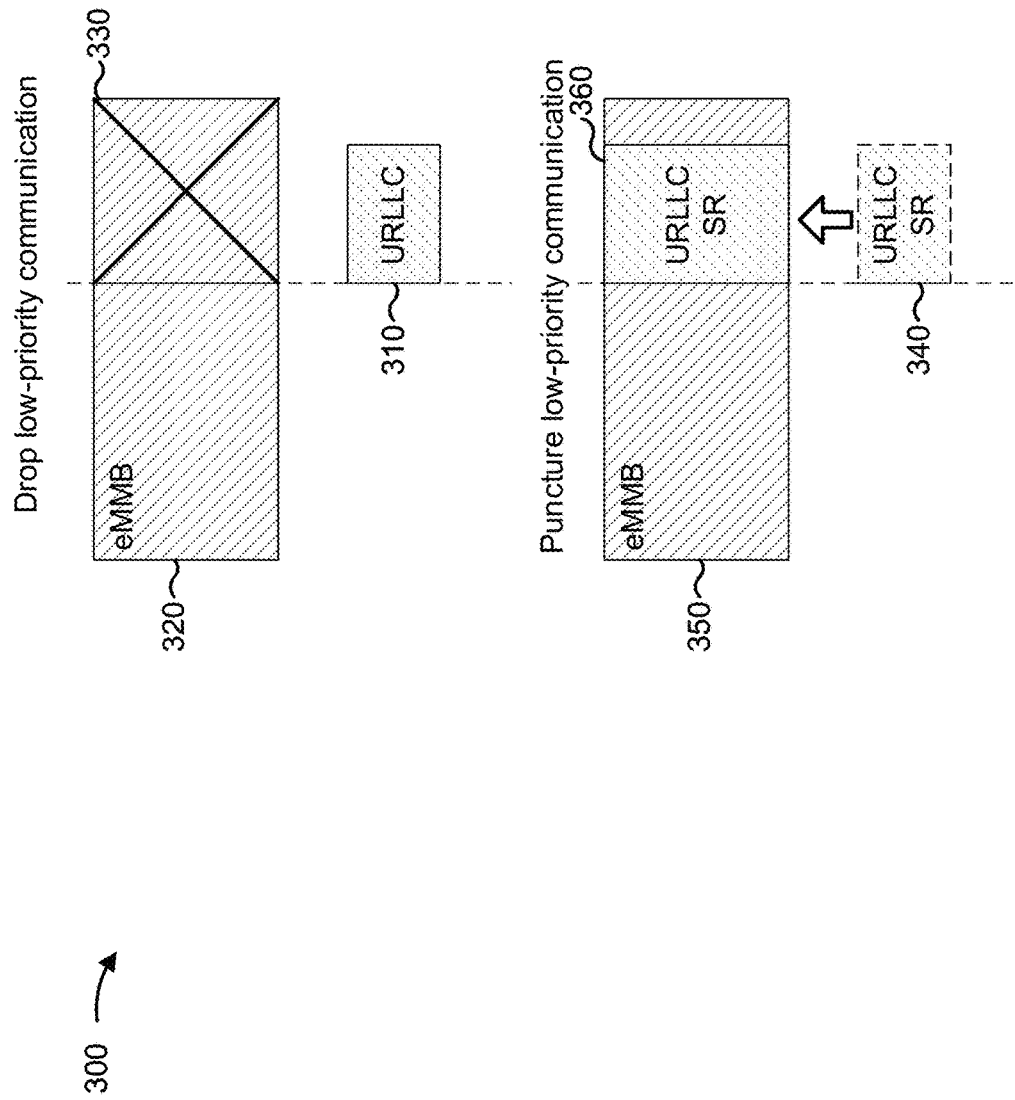
FIG. 3 is a diagram illustrating an example of physical (PHY)-layer ultra-reliable low-latency communication (URLLC) communication prioritization, in accordance with various aspects of the present disclosure.

FIG. 3 is a diagram illustrating an example 300 of PHY-layer URLLC communication prioritization, in accordance with various aspects of the present disclosure. The operations described in connection with FIG. 3 may be performed by a UE, such as UE 120. In some aspects, the operations described in connection with FIG. 3 may be performed by a physical (PHY) layer of a UE. As further shown, the operations described in connection with FIG. 3 may be performed for a first communication of a first traffic type (e.g., a first communication 310 of a URLLC traffic type) and a second communication of a second traffic type (e.g., a second communication 320 of an eMBB traffic type). The first communication 310 and the second communication 320 may be uplink communications to be transmitted by the UE. For example, an uplink communication may include or be a scheduling request, a grant-based data channel (e.g., a physical uplink shared channel (PUSCH) and/or the like), a grant-free data channel, and/or the like. As used herein, "scheduling request" may refer to a positive scheduling request.

Two different techniques are described in connection with FIG. 3: a dropping technique, shown in the top part of FIG. 3, and a puncturing technique, shown in the bottom part of FIG. 3. In FIG. 3, the horizontal axis may represent time. When two communications are shown in different vertical positions, the two communications may be associated with different frequencies, although the vertical axis is not presented as an exact representation of the frequencies or the frequency relationship of the different communications.

As shown in the top part of FIG. 3, and by reference number 330, in some aspects, the PHY layer of the UE 120 may drop at least part of the second communication 320 based at least in part on a collision between the first communication 310 and the second communication 320 and based at least in part on the first communication 310 having a higher priority level than the second communication 320. For example, the UE may drop at least a portion of the second communication 320 that overlaps the first communication 310 in at least one colliding resource. In some aspects, the UE may select the first communication 310 as a selected communication for transmission in the resource associated with the first communication 310. For example, the UE may not be capable of simultaneously transmitting the first communication 310 and the second communication 320, so the PHY layer of the UE may select one of the first communication 310 or the second communication 320 for transmission in the at least one colliding resource. In some aspects, the UE may select the selected communication as another communication is ongoing. For example, the UE may select the first communication 310 for transmission before or as the UE transmits the second communication 320, and may drop at least a portion of the second communication 320 when the first communication 310 is to be transmitted. In this way, the PHY layer of the UE provides for on-the-fly prioritization of a high-priority communication, thereby reducing delay and latency that might otherwise be caused by MAC-layer prioritization of the high-priority communication.

In some aspects, the UE may select the selected communication based at least in part on a rule. For example, the rule may indicate which communication is to be prioritized based at least in part on traffic types of the first communication and the second communication, based at least in part on a communication type of the first communication, and/or the like. As one example, the rule may indicate that an eMBB communication is always to be dropped and that a URLLC communication is always to be selected when the eMBB communication and the URLLC communication are associated with a colliding resource.

In some aspects, the UE (e.g., the PHY layer of the UE) may drop a non-overlapped portion of a communication. For example, the UE may drop a non-overlapped portion of a communication that is after an overlapped portion. In some aspects, the UE may drop the non-overlapped portion based at least in part on a capability of the UE. For example, the UE may determine that the non-overlapped portion is to be dropped when the UE is not able to maintain phase continuity between the non-overlapped portion before the selected communication and the non-overlapped portion after the selected communication.

In some aspects, the UE (e.g., the PHY layer of the UE) may determine that the selected communication is to puncture the other communication, as described in connection with the bottom half of FIG. 3. As used herein, puncturing refers to transmitting a selected communication using the same frequency and time resources as an other communication. For example, assume that the first communication 340 is a scheduling request and the second communication 350 is a PUSCH. In that case, the UE may determine that the scheduling request is to puncture the PUSCH. As shown by reference number 360, the UE may transmit the first communication 340 by puncturing the second communication 350.

In some aspects, the UE (e.g., the PHY layer of the UE) may transmit a particular sequence to puncture the other communication. For example, the UE may replace the PUSCH with a sequence (e.g., a known sequence, a predefined sequence, a configured sequence, a sequence known to the UE and the BS, etc.) that has a same bandwidth and power level as the PUSCH. The sequence may identify the selected communication or may be based at least in part on the selected communication. For example, a recipient of the sequence may determine that the sequence corresponds to the selected communication, and may thereby identify the selected communication. In some aspects, the sequence may include a demodulation reference signal sequence and/or the like. For example, the sequence may include the same demodulation reference signal sequence as used for the PUSCH or the other communication. Thus, the UE may perform puncturing without disrupting a transmit frequency, bandwidth, or power of the PUSCH, thereby improving UE performance and reducing time associated with retuning or adjusting the transmission.

In some aspects, a MAC layer of the UE may select a communication for transmission by the UE (not shown in FIG. 3). For example, assume that a first logical channel (e.g., communication) is a buffer status report (BSR) and a second logical channel is a data channel. In that case, the MAC layer of the UE may determine whether the BSR or the data channel is to be transmitted based at least in part on respective traffic types of the BSR and the data channel (e.g., eMBB or URLLC). For example, when the BSR and the data channel are associated with the same traffic type, then the MAC layer may determine that the BSR is to be prioritized over the data channel, thus improving likelihood that the BSR is transmitted in a timely fashion. When the BSR and the data channel are associated with different traffic types, then the MAC layer may determine that a URLLC data channel should be prioritized over an eMBB BSR, thus ensuring that low-latency traffic requirements are satisfied. In some aspects, the UE may be configured (e.g., dynamically, semi-statically, statically, etc.) with information indicating whether the eMBB BSR could be carried in the URLLC data channel. If the BSR is allowed to be carried on a URLLC PUSCH, then the UE may first map URLLC traffic (both BSR and data) into the URLLC PUSCH resource, and may map the BSR into remaining (if any) PUSCH resources. On the other hand, if the UE is configured not to transmit eMBB BSR on a URLLC PUSCH, then the UE may not transmit any eMBB BSR on the URLLC PUSCH (regardless of whether remaining available resources are available on the URLLC PUSCHs or not).

In some aspects, the UE (e.g., the PHY layer of the UE) may determine an error case based at least in part on an overlap or collision between two communications (not shown in FIG. 3). For example, in some cases, the network may be permitted to configure a scheduling request to be transmitted on a physical random access (PRACH) resource. However, when the UE is configured to handle URLLC prioritization in the PHY layer, it may be complex and difficult to determine whether a scheduling request is associated with URLLC or eMBB, and whether scheduling requests associated with different traffic types are to be prioritized over the PRACH transmission. In some aspects, the UE may determine or transmit information indicating an error when the UE detects that the scheduling request is configured on the PRACH resource. For example, the UE may determine or transmit information indicating the error when the scheduling request is configured on the PRACH resource and when the UE is configured to perform PHY-layer URLLC prioritization. Thus, the UE conserves processing resources that would otherwise be used to determine whether a scheduling request is associated with URLLC or eMBB for prioritization with regard to a PRACH resource.

As indicated above, FIG. 3 is provided as an example. Other examples may differ from what is described with respect to FIG. 3.

Figure 4:
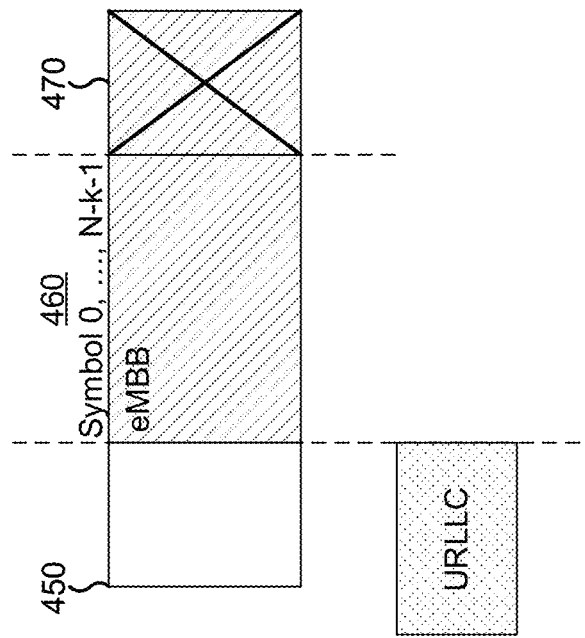
FIG. 4 is a diagram illustrating an example of PHY-layer URLLC communication prioritization, in accordance with various aspects of the present disclosure.
Figure 4:
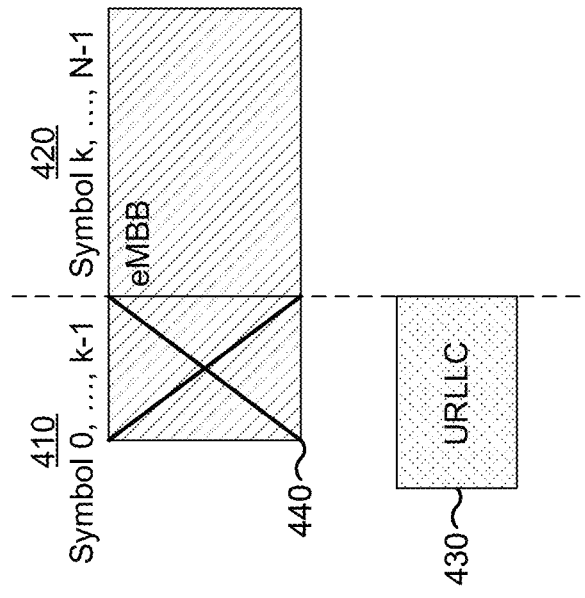

FIG. 4 is a diagram illustrating an example 400 of PHY-layer URLLC communication prioritization, in accordance with various aspects of the present disclosure. As shown in FIG. 4, an eMBB communication may include symbols 0 through k−1 (shown by reference number 410) and symbols k through N−1 (shown by reference number 420). In some aspects, a URLLC communication (shown by reference number 430) may collide with or overlap the eMBB communication.

As shown by reference number 440, in some aspects, the UE (e.g., the PHY layer of the UE) may drop symbols 0 through k−1 of the eMBB communication. Thus, the UE may eliminate the collision or overlap between the eMBB communication and the URLLC communication. In some aspects (e.g., here and/or elsewhere herein) the UE may retransmit the dropped symbols, may rate match a remainder of the eMBB communication to include the dropped symbols, and/or the like.

In some aspects, the first 0 through k−1 symbols may carry important information for the eMBB communication, such as a demodulation reference signal (DMRS) and/or the like. In such a case, and as shown by reference number 450, the UE (e.g., the PHY layer of the UE) may delay transmission of the eMBB communication, and may transmit the URLLC communication in the now-vacant symbols 0 through k−1. As shown by reference number 460, the UE may transmit the eMBB communication (e.g., symbols 0 through N−k−1) after the URLLC communication. As shown by reference number 470, in some aspects, the UE may drop an end of the eMBB communication (e.g., symbols N−k through N−1). Thus, the UE may preserve DMRS or other important information at the beginning of the eMBB communication while enabling transmission of the URLLC communication.

As indicated above, FIG. 4 is provided as an example. Other examples may differ from what is described with respect to FIG. 4.

Figure 5:
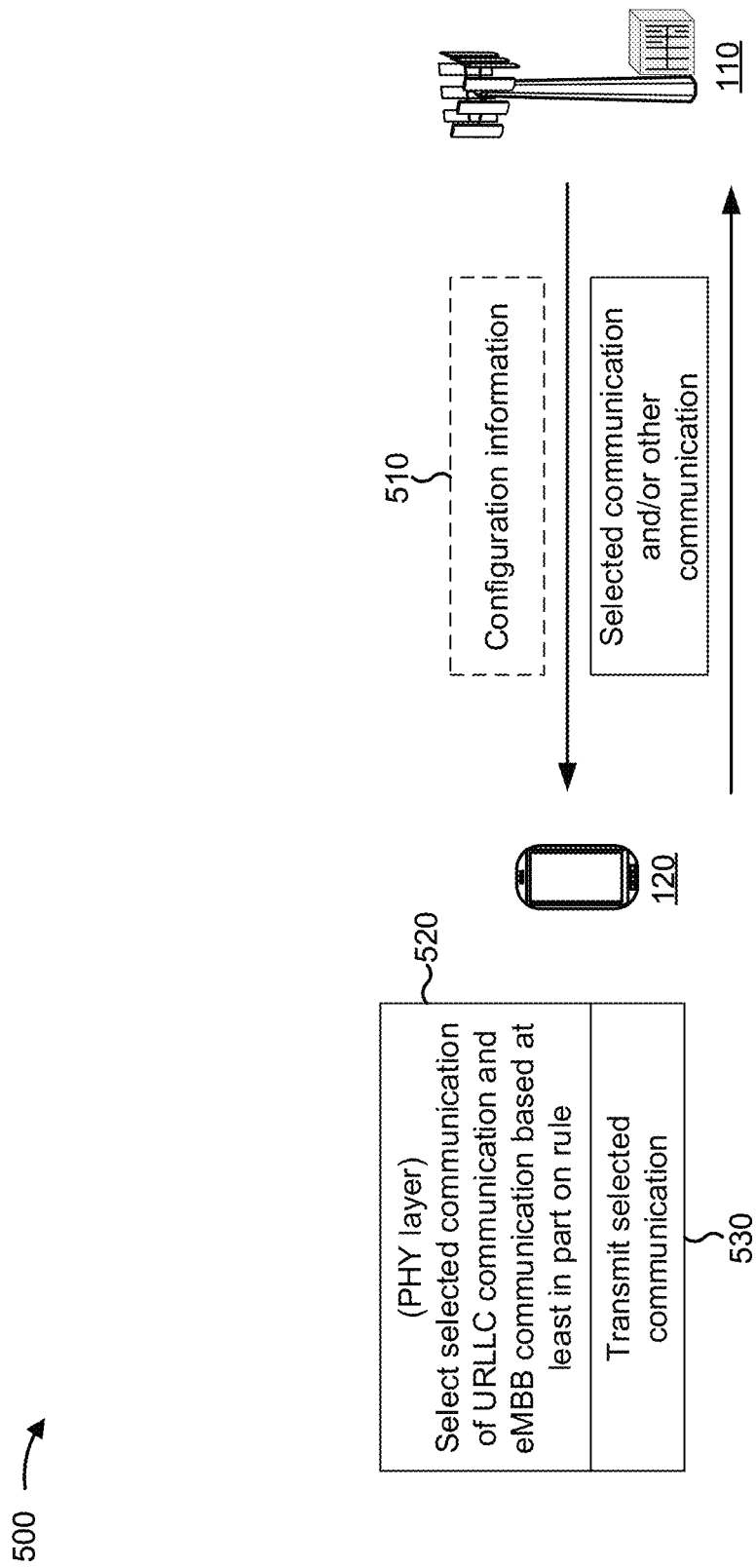
FIG. 5 is a diagram illustrating an example of PHY-layer URLLC prioritization, in accordance with various aspects of the present disclosure.

FIG. 5 is a diagram illustrating an example 500 of PHY-layer URLLC prioritization, in accordance with various aspects of the present disclosure.

As shown in FIG. 5, and by reference number 510, a UE 120 may optionally receive configuration information from a BS 110. In some aspects, the configuration information may indicate a rule for prioritizing traffic at the PHY layer. In some aspects, the configuration information may identify a physical channel configuration for one or more traffic types, as described in more detail below. In some aspects, the configuration information may indicate whether the UE is to perform MAC-layer URLLC prioritization (e.g., based at least in part on an eMBB BSR and a URLLC PUSCH), as described in more detail elsewhere herein. In some aspects, the configuration information may indicate whether the UE 120 is to perform URLLC prioritization at the PHY layer.

In some aspects, the configuration information may relate to PHY-layer prioritization of communications. For example, the configuration information may include information to be used to determine a priority level of a communication associated with a particular traffic type. In some aspects, the configuration information may relate to a communication with a configured or pre-configured grant, such as a PUSCH with a configured grant, a downlink semi-persistent scheduling communication, and/or the like. The UE 120 may use the configuration information to determine a priority of the communication, as described in more detail elsewhere herein.

In some aspects, the configuration information may include a radio resource control (RRC) information element (IE). For example, the RRC IE may indicate a set of parameters for a transmission with a configured grant (e.g., MCS table, repetition factor, MCS, resource allocation, etc.). In some aspects, the RRC IE may relate to a particular traffic type, and may indicate a set of parameters for transmission with a configured grant for the particular traffic type. For example, the UE 120 may receive two or more RRC IEs corresponding to each traffic type for which the UE 120 is to perform PHY-layer prioritization (e.g., eMBB, URLLC, etc.). Based at least in part the respective IEs, the UE 120 may determine what parameters to apply for eMBB transmission and URLLC transmission. The UE 120 may also determine whether a particular transmission is associated with a particular traffic type. As such, the UE 120 may be able to apply a rule to prioritize the particular traffic type in the PHY layer, since the UE 120 can identify a communication as associated with the particular traffic type.

In some aspects, the configuration information may include an indicator that indicates the priority level to be used for a corresponding communication. For example, the configuration information may indicate that a corresponding communication (e.g., a communication that matches the physical uplink channel configuration of the configuration information) is to be assigned a particular priority level. The UE 120 may determine a selected communication based at least in part on the particular priority level and based at least in part on a rule, as described in more detail elsewhere herein.

In some aspects, the configuration information may indicate which modulation and coding scheme (MCS) table is to be used for a communication. The UE 120 may select the selected communication based at least in part on which MCS table is to be used for the communication. For example, the UE 120 may assign a higher priority level to a communication associated with a first MCS table (e.g., a new MCS table, an MCS table for URLLC, etc.) than a communication associated with a second MCS table (e.g., an MCS table for eMBB communications, etc.). In this way, the UE 120 may determine the priority level based at least in part on an MCS table of the communication, which conserves resources that would otherwise be used to explicitly signal the priority level.

As shown by reference number 520, the UE 120 may select the selected communication, of a URLLC communication and an eMBB communication, based at least in part on a rule. This is described in more detail elsewhere herein.

As shown by reference number 530, the UE 120 may transmit the selected communication. For example, the UE 120 may transmit the selected communication, and may drop, delay, rate match, or partially drop the other communication (e.g., the non-selected communication). In some aspects, the UE 120 may receive a selected communication. For example, the techniques and apparatuses described herein may be equally application for uplink communications and downlink communications.

As indicated above, FIG. 5 is provided as an example. Other examples may differ from what is described with respect to FIG. 5.

Figure 6:
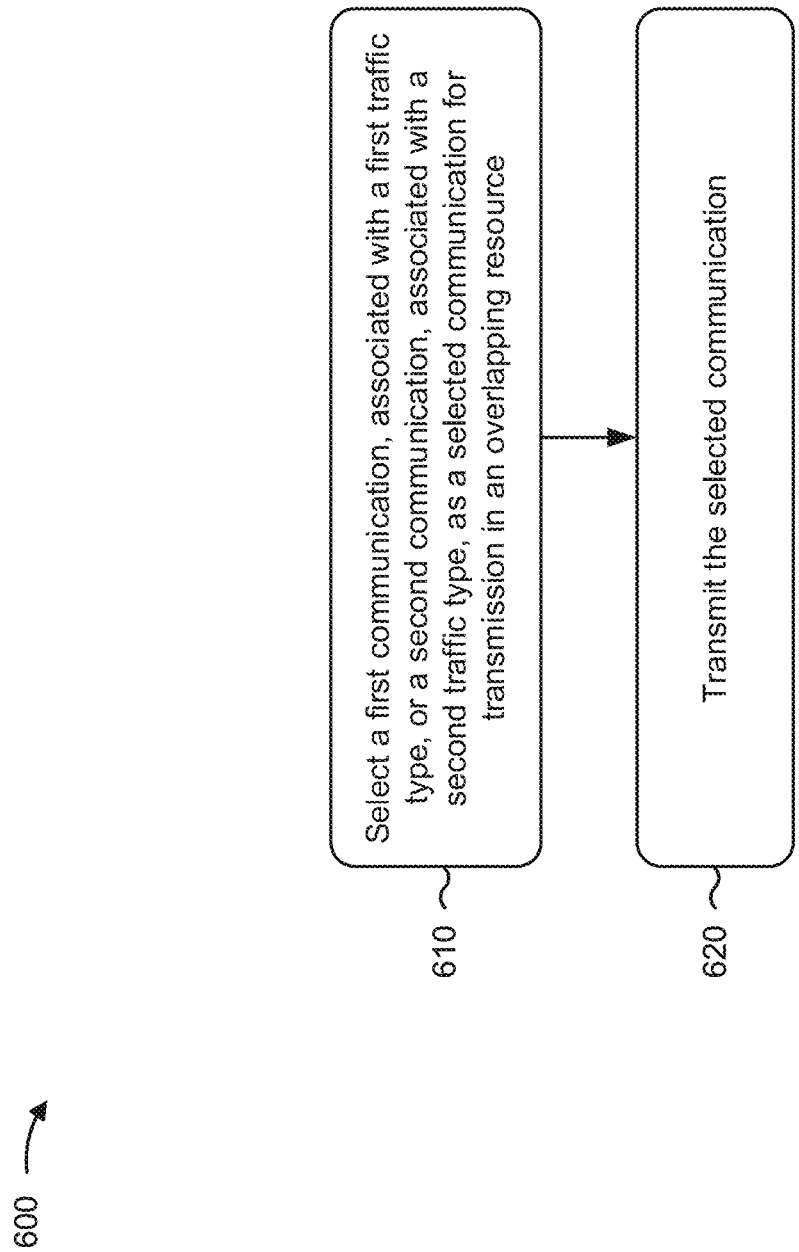
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs PHY-layer URLLC communication prioritization.

As shown in FIG. 6, in some aspects, process 600 may include selecting a first communication, associated with a first traffic type, or a second communication, associated with a second traffic type, as a selected communication for transmission in an overlapping resource (block 610). For example, the UE (e.g., using controller/processor 280 and/or the like) may select a first communication or a second communication as a selected communication for transmission in an overlapping resource. The first communication may be associated with a first traffic type and the second communication may be associated with a second traffic type. In some aspects, the first traffic type is an ultra-reliable low latency communication traffic type and the second traffic type is an enhanced mobile broadband traffic type. The first communication and the second communication may at least partially overlap in time (e.g., in the overlapped resource). The selection may be performed based at least in part on a rule.

As shown in FIG. 6, in some aspects, process 600 may include transmitting the selected communication (block 620). For example, the UE (e.g., using controller/processor 280, transmit processor 264, TX MIMO processor 266, MOD 254, antenna 252, and/or the like) may transmit the selected communication. In some aspects, the UE may transmit at least part of the other communication (e.g., other than the selected communication).

Process 600 may include additional aspects, such as any single aspect or any combination of aspects described below and/or in connection with one or more other processes described elsewhere herein.

In a first aspect, the first traffic type is an ultra-reliable low latency communication traffic type and the second traffic type is an enhanced mobile broadband traffic type. In a second aspect, alone or in combination with the first aspect, the rule indicates that the first communication is always selected based at least in part on the first communication being an ultra-reliable low-latency communication and the second communication being an enhanced mobile broadband communication. In a third aspect, alone or in combination with the first aspect and/or the second aspect, the UE may drop an other communication, of the first communication and the second communication and other than the selected communication. In a fourth aspect, alone or in combination with any one or more of the first through third aspects, a portion of the other communication that is non-overlapped with the selected communication is dropped, wherein the portion is after the selected communication. In a fifth aspect, alone or in combination with any one or more of the first through fourth aspects, the portion is dropped based at least in part on a capability of the UE. In a sixth aspect, alone or in combination with any one or more of the first through fifth aspects, the portion is dropped based at least in part on the portion and an other portion of the other communication that is non-overlapped with the selected communication being non-phase-continuous.

In a seventh aspect, alone or in combination with any one or more of the first through sixth aspects, the selection is performed while a communication, of the first communication and the second communication, is transmitted. In an eighth aspect, alone or in combination with any one or more of the first through seventh aspects, the selected communication punctures an other communication, of the first communication and the second communication and other than the selected communication, and the first communication is a positive scheduling request and the second communication is a data channel. In a ninth aspect, alone or in combination with any one or more of the first through eighth aspects, a punctured portion of the other communication is replaced with a sequence of equal power and bandwidth as the other communication, wherein the sequence indicates the selected communication. In a tenth aspect, alone or in combination with any one or more of the first through ninth aspects, the selected communication is transmitted in a physical resource corresponding to the punctured portion of the other communication. In an eleventh aspect, alone or in combination with any one or more of the first through tenth aspects, a time duration of the sequence or a number of orthogonal frequency division multiplexing symbols of the sequence is equal to that of the physical resource scheduled to transmit the selected communication.

In a twelfth aspect, alone or in combination with any one or more of the first through eleventh aspects, the first communication is a scheduling request and the second communication is a data channel. In a thirteenth aspect, alone or in combination with any one or more of the first through twelfth aspects, the first communication and the second communication comprise at least one of a positive scheduling request, an uplink data channel with dynamic grant, or an uplink data channel with configured grant. In a fourteenth aspect, alone or in combination with any one or more of the first through thirteenth aspects, the rule indicates that, when the first communication is overlapped with a first portion of the second communication, the second communication is to be delayed until an end of the first portion and the first communication is to be transmitted as the selected communication. In a fifteenth aspect, alone or in combination with any one or more of the first through fourteenth aspects, the selection is at least partially performed in a physical layer of the UE. In a sixteenth aspect, alone or in combination with any one or more of the first through fifteenth aspects, the rule is based at least in part on respective priority levels of the first communication and the second communication.

In a seventeenth aspect, alone or in combination with any one or more of the first through sixteenth aspects, at least one of the first communication or the second communication comprise a data channel with a configured grant. In an eighteenth aspect, alone or in combination with any one or more of the first through seventeenth aspects, a priority level of the at least one of the first communication or the second communication is indicated by respective uplink configured grant configurations of the first traffic type and the second traffic type. In a nineteenth aspect, alone or in combination with any one or more of the first through eighteenth aspects, the priority level of the data channel with the configured grant is indicated by a field of a configuration of the configured grant. In a twentieth aspect, alone or in combination with any one or more of the first through nineteenth aspects, the respective priority levels are associated with corresponding modulation and coding scheme tables, and the respective priority levels of the first communication and the second communication are indicated by which modulation and coding scheme tables, of the corresponding modulation and coding scheme tables, are to be used for the first communication and the second communication. In a twenty-first aspect, alone or in combination with any one or more of the first through twentieth aspects, the priority level of the data channel with the configured grant is determined based on a modulation and coding scheme table configuration that is included as a parameter in a configuration of the configured grant.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
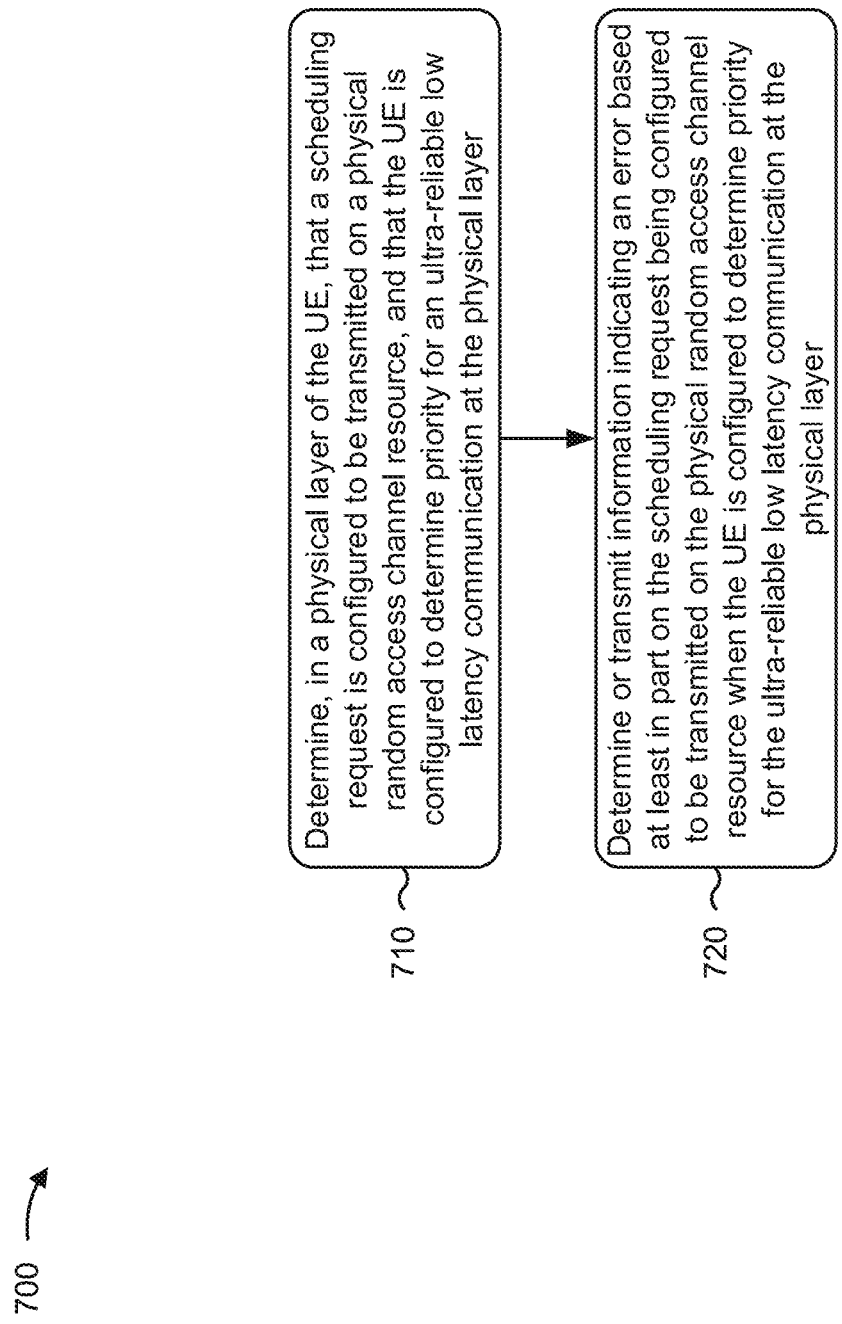
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs PHY-layer URLLC communication prioritization.

As shown in FIG. 7, in some aspects, process 700 may include determining, in a physical layer of the UE, that a scheduling request is configured to be transmitted on a physical random access channel resource, and that the UE is configured to determine priority for an ultra-reliable low latency communication at the physical layer (block 710). For example, the UE (e.g., using controller/processor 280 and/or the like) may determine, in a physical layer of the UE, that a scheduling request overlaps with a PRACH resource. The UE may be configured to determine priority for a URLLC at the physical layer.

As shown in FIG. 7, in some aspects, process 700 may include determining or transmitting information indicating an error based at least in part on the scheduling request being configured to be transmitted on the physical random access channel resource when the UE is configured to determine priority for the ultra-reliable low latency communication at the physical layer (block 720). For example, the UE (e.g., using controller/processor 280, transmit processor 264, TX MIMO processor 266, MOD 254, antenna 252, and/or the like) may determine or transmit information indicating an error. The UE may determine or transmit the information indicating the error based at least in part on the scheduling request resource overlapping with the PRACH resource when the UE is configured to determine priority for the URLLC communication at the physical layer.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
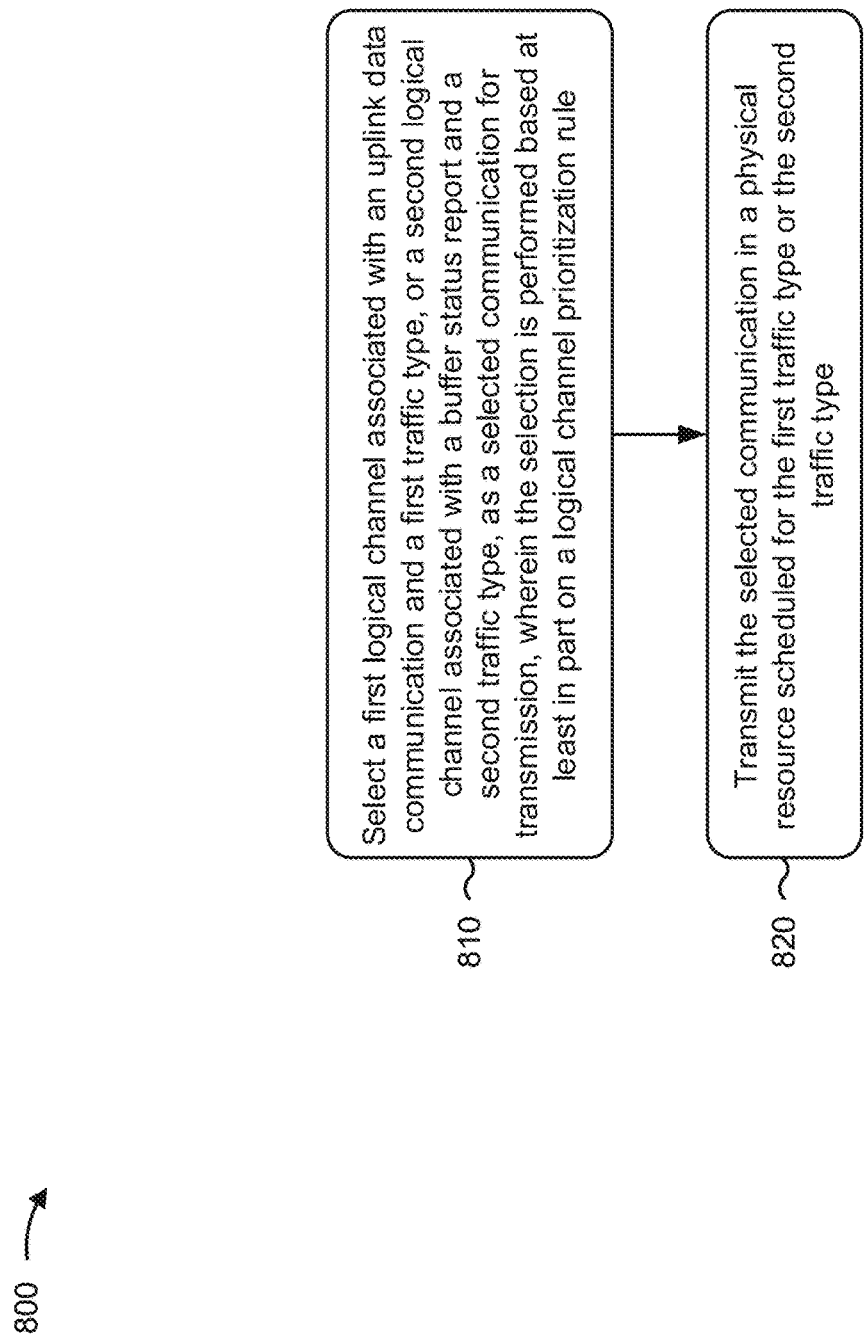
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs MAC-layer URLLC communication prioritization.

As shown in FIG. 8, in some aspects, process 800 may include selecting a first logical channel associated with an uplink data communication and a first traffic type, or a second logical channel associated with a buffer status report and a second traffic type, as a selected communication for transmission, wherein the selection is performed based at least in part on a logical channel prioritization rule (block 810). For example, the UE (e.g., using controller/processor 280 and/or the like) may select a first logical channel (e.g., a first communication) or a second logical channel (e.g., a second communication) as a selected communication for a transmission. The first logical channel may be associated with a first traffic type and the second logical channel may be associated with a second traffic type. The selection may be performed based at least in part on a rule, such as a logical channel prioritization rule. In some aspects, the first traffic type is an ultra-reliable low latency communication traffic type and the second traffic type is an enhanced mobile broadband traffic type.

As shown in FIG. 8, in some aspects, process 800 may include transmitting the selected communication in a physical resource scheduled for the first traffic type or the second traffic type (block 820). For example, the UE (e.g., using controller/processor 280, transmit processor 264, TX MIMO processor 266, MOD 254, antenna 252, and/or the like) may transmit the selected communication. In some aspects, a MAC layer of the UE may provide the communication to a PHY layer of the UE, and the PHY layer may cause transmission of the communication by the UE.

Process 800 may include additional aspects, such as any single aspect or any combination of aspects described below and/or in connection with one or more other processes described elsewhere herein.

In a first aspect, the first logical channel is prioritized over the second logical channel when the first traffic type is an ultra-reliable low-latency communication traffic type and the second traffic type is an enhanced mobile broadband traffic type.

In a second aspect, alone or in combination with the first aspect, the UE may receive a configuration of the UE that indicates whether the buffer status report associated with the enhanced mobile broadband traffic type can be carried in a physical layer resource associated with the ultra-reliable low-latency communication traffic type. In some aspects, when the configuration indicates that the buffer status report cannot be carried in the physical layer resource associated with the ultra-reliable low-latency communication traffic type, the method further comprises mapping the buffer status report to a resource not associated with the ultra-reliable low-latency communication traffic type.

In a third aspect, alone or in combination with the first aspect and/or the second aspect, when the first traffic type and the second traffic type are the same traffic type, the logical channel prioritization rule indicates to select the second logical channel as the selected communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   selecting, based at least in part on receiving, from a network node, configuration information that indicates a rule, one of a first communication, associated with a first traffic type, or a second communication, associated with a second traffic type, as a selected communication for transmission when the first communication and the second communication at least partially overlap in time,
      wherein the first traffic type is an ultra-reliable low-latency communication traffic type and the second traffic type is an enhanced mobile broadband traffic type, and
      wherein the first communication comprises an uplink data channel with configured grant, and the second communication comprises an uplink data channel with dynamic grant; and
   transmitting the selected communication.

2. The method of claim 1, wherein the rule indicates that the first communication is always selected based at least in part on the first communication being an ultra-reliable low-latency communication and the second communication being an enhanced mobile broadband communication.

3. The method of claim 1, further comprising:
   dropping an other communication, of the first communication and the second communication and other than the selected communication.

4. The method of claim 3, wherein a portion of the other communication that is non-overlapped with the selected communication is dropped, and wherein the portion is after the selected communication.

5. The method of claim 1, wherein the selected communication punctures an other communication, of the first communication and the second communication and other than the selected communication.

6. The method of claim 1, wherein the rule is based at least in part on respective priority levels of the first communication and the second communication.

7. The method of claim 6, wherein a priority level of the at least one of the first communication or the second communication is indicated by one or more uplink configured grant configurations associated with at least one of the first traffic type or the second traffic type.

8. The method of claim 6, wherein the priority level of the uplink data channel with the configured grant is indicated by a field of a configuration of the configured grant.

9. A user equipment (UE) for wireless communication, comprising:
   a memory; and
   one or more processors coupled to the memory, the memory and the one or more processors configured to:
      select, based at least in part on receiving, from a network node, configuration information that indicates a rule, one of a first communication, associated with a first traffic type, or a second communication, associated with a second traffic type, as a selected communication for transmission when the first communication and the second communication at least partially overlap in a resource and in time,
         wherein the first traffic type is an ultra-reliable low-latency communication traffic type and the second traffic type is an enhanced mobile broadband traffic type, and
         wherein the first communication comprises an uplink data channel with configured grant, and the second communication comprises an uplink data channel with dynamic grant; and
      transmit the selected communication.

10. The UE of claim 9, wherein the rule indicates that the first communication is always selected based at least in part on the first communication being an ultra-reliable low-latency communication and the second communication being an enhanced mobile broadband communication.

11. The UE of claim 9, wherein the one or more processors are further configured to:
   drop an other communication, of the first communication and the second communication and other than the selected communication.

12. The UE of claim 11, wherein a portion of the other communication that is non-overlapped with the selected communication is dropped, and wherein the portion is after the selected communication.

13. The UE of claim 9, wherein the selected communication punctures an other communication, of the first communication and the second communication and other than the selected communication.

14. The UE of claim 9, wherein the rule is based at least in part on respective priority levels of the first communication and the second communication.

15. The UE of claim 14, wherein a priority level of the at least one of the first communication or the second communication is indicated by one or more uplink configured grant configurations associated with at least one of the first traffic type or the second traffic type.

16. The UE of claim 14, wherein the priority level of the uplink data channel with the configured grant is indicated by a field of a configuration of the configured grant.

17. A non-transitory computer-readable medium storing one or more instructions, the one or more instructions comprising:
   one or more instructions that, when executed by one or more processors, cause the one or more processors to:
      select, based at least in part on receiving, from a network node, configuration information that indicates a rule, one of a first communication, associated with a first traffic type, or a second communication, associated with a second traffic type, as a selected communication for transmission when the first communication and the second communication at least partially overlap in time, wherein the first traffic type is an ultra-reliable low-latency communication traffic type and the second traffic type is an enhanced mobile broadband traffic type, and wherein the first communication comprises an uplink data channel with configured grant, and the second communication comprises an uplink data channel with dynamic grant; and transmit the selected communication.

18. The non-transitory computer-readable medium of claim 17, wherein the one or more instructions further cause the one or more processors to:

drop an other communication, of the first communication and the second communication and other than the selected communication.

19. The non-transitory computer-readable medium of claim 18, wherein a portion of the other communication that is non-overlapped with the selected communication is dropped, and wherein the portion is after the selected communication.

20. The non-transitory computer-readable medium of claim 17, wherein the rule is based at least in part on respective priority levels of the first communication and the second communication.

21. The non-transitory computer-readable medium of claim 20, wherein a priority level of the at least one of the first communication or the second communication is indicated by one or more uplink configured grant configurations associated with at least one of the first traffic type or the second traffic type.

22. The non-transitory computer-readable medium of claim 20, wherein the priority level of the data channel with the configured grant is indicated by a field of a configuration of the configured grant.

23. The non-transitory computer-readable medium of claim 17, wherein the rule indicates that the first communication is always selected based at least in part on the first communication being an ultra-reliable low-latency communication and the second communication being an enhanced mobile broadband communication.

24. An apparatus for wireless communication, comprising:

means for selecting, based at least in part on receiving, from a network node, configuration information that indicates a rule, one of a first communication, associated with a first traffic type, or a second communication, associated with a second traffic type, as a selected communication for transmission when the first communication and the second communication at least partially overlap in time, wherein the first traffic type is an ultra-reliable low-latency communication traffic type and the second traffic type is an enhanced mobile broadband traffic type, and wherein the first communication comprises an uplink data channel with configured grant, and the second communication comprises an uplink data channel with dynamic grant; and means for transmitting the selected communication.

25. The apparatus of claim 24, further comprising:

means for dropping an other communication, of the first communication and the second communication and other than the selected communication.

26. The apparatus of claim 25, wherein a portion of the other communication that is non-overlapped with the selected communication is dropped, and wherein the portion is after the selected communication.

27. The apparatus of claim 24, wherein the rule is based at least in part on respective priority levels of the first communication and the second communication.

28. The apparatus of claim 27, wherein a priority level of the at least one of the first communication or the second communication is indicated by one or more uplink configured grant configurations associated with at least one of the first traffic type or the second traffic type.

29. The apparatus of claim 27, wherein the priority level of the data channel with the configured grant is indicated by a field of a configuration of the configured grant.

30. The apparatus of claim 24, wherein the rule indicates that the first communication is always selected based at least in part on the first communication being an ultra-reliable low-latency communication and the second communication being an enhanced mobile broadband communication.

* * * * *